(12) United States Patent
Hou

(10) Patent No.: US 8,579,305 B2
(45) Date of Patent: Nov. 12, 2013

(54) LEVEL PULLING TYPE PET CARRYING CART

(76) Inventor: Cheuh Li Hou, Taipei (TW)

( * ) Notice: Subject to any disclaimer, the term of this patent is extended or adjusted under 35 U.S.C. 154(b) by 0 days.

(21) Appl. No.: 13/445,891

(22) Filed: Apr. 12, 2012

(65) Prior Publication Data

US 2013/0033015 A1 Feb. 7, 2013

(30) Foreign Application Priority Data

Aug. 4, 2011 (TW) .............................. 100214417 U

(51) Int. Cl.
*B62B 3/00* (2006.01)

(52) U.S. Cl.
USPC ..... 280/47.371; 280/37; 280/655; 280/655.1; 280/657

(58) Field of Classification Search
USPC .............. 280/47.371, 47.34, 655, 655.1, 657; 190/18 A, 39, 115–117; 403/11, 12, 42, 403/61, 83, 112, 113, 321, 322.1, 322.3, 403/325, 326, 331
See application file for complete search history.

(56) References Cited

U.S. PATENT DOCUMENTS

| 230,676 | A | * | 8/1880 | Taylor | 280/47.371 |
| 2,596,629 | A | * | 5/1952 | Ward | 280/491.3 |
| 5,769,194 | A | * | 6/1998 | Chang | 190/18 A |
| 6,021,740 | A | * | 2/2000 | Martz | 119/497 |
| 6,223,691 | B1 | * | 5/2001 | Beattie | 119/453 |
| 6,230,656 | B1 | * | 5/2001 | Walach | 119/496 |
| 6,877,764 | B2 | * | 4/2005 | Sagol | 280/655.1 |
| 6,896,272 | B1 | * | 5/2005 | Burton | 280/47.371 |
| 7,261,060 | B1 | * | 8/2007 | Garofola et al. | 119/496 |
| 2003/0067130 | A1 | * | 4/2003 | Gordon | 280/47.34 |
| 2003/0085540 | A1 | * | 5/2003 | Sadow | 280/47.26 |
| 2009/0114493 | A1 | * | 5/2009 | Leung | 190/18 A |

* cited by examiner

*Primary Examiner* — John R Olszewski
*Assistant Examiner* — Steve Clemmons
(74) *Attorney, Agent, or Firm* — Raymond Y. Chan; David and Raymond Patent Firm

(57) ABSTRACT

A level pulling type pet carrying cart includes a main body, a rotatable pushing arrangement and a retaining assembly. The main body has a base frame, a side frame and a plurality of wheels provided below the base frame. The rotatable pushing arrangement includes a connecting arm and a stretchable pushing arm which is capable of rotating with respect to the connecting arm. The retaining assembly includes a retaining base and a connecting band, wherein the connecting band has a first end connected to a top surface of the retaining base and a second end connected to a center on top of the side frame so as to pull the retaining base to move upwardly and also controlling a rotation angle of the stretchable pushing arm. Thus, the whole body is maintained to move smoothly along a horizontal level.

10 Claims, 8 Drawing Sheets

LEVEL PULLING TYPE PET CARRYING CART

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

1. Field of Invention

The present invention relates to a pet carrying cart, and more particularly to a level pulling type pet carrying cart which is capable of moving in a horizontal level to maintain balance of the cart, so that it is more comfortable and safe for a pet.

2. Description of Related Arts

In the modern society, the number of children in a family becomes less and less and more and more people prefer not to have a child. Instead, raising a pet becomes a new hobby for single person or married family to enliven their lives. Studies have shown that people are healthier with company of pets. Dogs not only can relieve pressure of the owners but also are good friends of human beings. Among various kinds of pet, dogs are the most commonly raised pets. Therefore, a compassionate pet host treats his or her dog like her child and walks his or her dog from time to time.

A dog chain is a basic tool when a host wants to take a walk with his or her dog. A pet pulling cart is also used because hosts don't want their dogs to be moistened with dirt nor bacteria on the road or want to prevent their dogs from running around in a public place such as a department store. When a dog sits quietly in a pet bag in a pet pulling cart, the dog is prevented from contacting with dirt and bacteria as well as running around and scaring people. And thus, a pet pulling cart is also a useful pet tool in the market.

Referring to FIG. 1 of the drawing, a sectional view of a conventional pet pulling cart is illustrated, wherein the structure of the conventional pet pulling cart is similar with a shopping basket pulling cart. The body of the cart can be leaned to rotate towards the user to move smoothly. Thus, the pet pulling cart is moving and being substantially in an inclined state, so the pet carried in the pet pulling cart is also leaning to one side and could have a feeling that the cart may tip over. Therefore, the pet may also feel afraid that will affect its stability. The scaring pet may jump out of the cart when the cart is moving and could cause danger to the pet. In addition, the conventional pet pulling cart can only move forwardly and backwardly but not a 360° rotation, so that the conventional pet pulling cart is still relatively inconvenient.

Therefore, a pet pulling cart which can maintain its stability while moving along a horizontal level is required to prevent the pet leaning aside from having any unsecure feeling, and thus the pet can be carried in the pet pulling cart comfortably and calmly.

SUMMARY OF THE PRESENT INVENTION

A main object of the present invention is to provide a level pulling type pet carrying cart that can generally maintain its overall stability, so that the pet carrying cart can move smoothly and steadily along a horizontal level. And thus stability of the pet carrying cart in use is increased, so that the pet sitting therein can feel at ease and comfortable.

Another object of the present invention is to provide a level pulling type pet carrying cart with simple structure that reduces the manufacturing cost, meets the need of the market, and can be widely used.

Additional advantages and features of the invention will become apparent from the description which follows, and may be realized by means of the instrumentalities and combinations particular point out in the appended claims.

According to the present invention, the foregoing and other objects and advantages are attained by a level pulling type pet carrying cart, which comprises a main body, a rotatable pushing arrangement and a retaining assembly. The main body comprises a base frame, a side frame, and a plurality of wheels provided below the base frame. The side frame is positioned at a rear side of the base frame. The rotatable pushing arrangement comprises a connecting arm and a telescoping pushing arm, wherein the connecting arm is provided at the rear side of the base frame and also at a rear side of the side frame. The telescoping pushing arm is pivotally connected to a center of the connecting arm and is capable of rotating with respect to the connecting arm in such a manner that the telescoping pushing arm leans on the side frame and is capable of rotating in a direction away from the side frame. The retaining assembly comprises a retaining base and a connecting band, wherein the retaining base is provided at a center of the telescoping pushing arm and is capable of moving upwardly or downwardly. The connecting band comprises a first end connected to a top surface of the retaining base and a second end connected to a center on top of the side frame so as to pull the retaining base to move upwardly and also controlling a rotation angle of the telescoping pushing arm.

Preferably, the level pulling type pet carrying cart further comprises two foldable bending rods extended from a front side of the base frame at two sides below the base frame respectively, wherein each of the foldable bending rod is provided with a first wheel at an outer side thereof and two second wheel sets are extended from two sides below the side frame respectively. The two second wheel sets, each comprising two second wheels, are extended from a front side and a right side below the side frame respectively and capable of providing a 360° rotation. When the telescoping pushing arm leans on the side frame, the connecting band rides up to form a ring-shape handle.

In comparison with the conventional art, the pet carrying cart of the present invention is capable of moving along a horizontal level via the rotatable pushing arrangement, so that the stability of the cart is maintained during operation, and that the pet carrying cart is more steady and comfortable for the carrying pet. Thus, the pet is prevented from feeling uneasy and jumping out of the pet carrying cart that may cause danger to the pet because of the pet carrying cart is not stable. Furthermore, each of the second wheel sets is capable of rotating for 360° so that the whole cart can be operated more smoothly and thus the utility of the pet carrying cart is enhanced.

Still further objects and advantages will become apparent from a consideration of the ensuing description and drawings.

These and other objectives, features, and advantages of the present invention will become apparent from the following detailed description, the accompanying drawings, and the appended claims.

DETAILED DESCRIPTION OF THE PREFERRED EMBODIMENT

Figure 1:
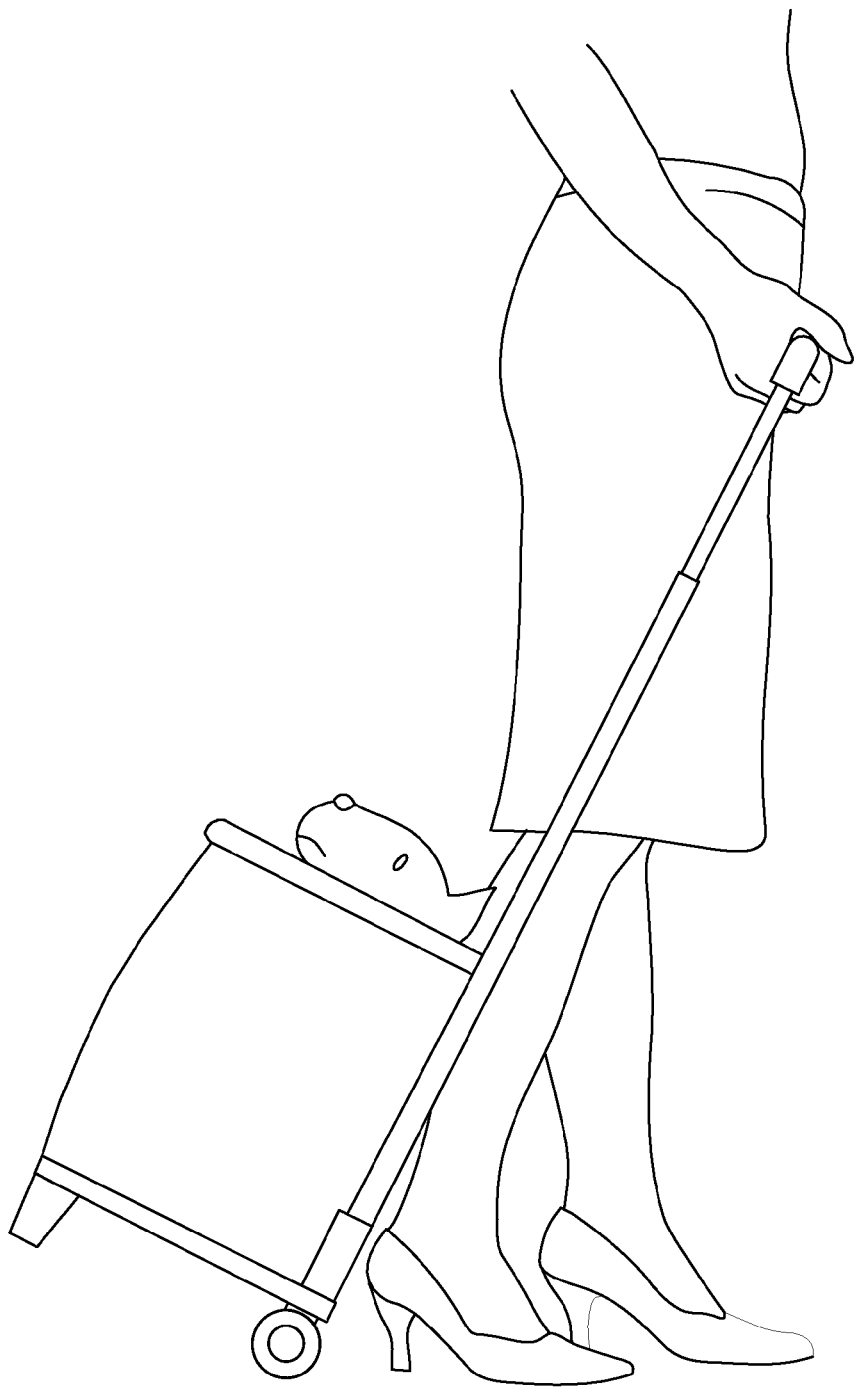
FIG. 1 is a schematic view illustrating a conventional level pulling type pet carrying cart being in use.

The following description is disclosed to enable any person skilled in the art to make and use the present invention. Preferable embodiments are provided in the following description only as examples and modifications will be apparent to those skilled in the art. The general principles defined in the following description would be applied to other embodiments, alternatives, modifications, equivalents, and applications without departing from the spirit and scope of the present invention.

It should be noticed that the drawings is for illustrating the spirit of the present invention, the structure of the embodiment shown in the drawings are not the same with an actual product of same number of elements, shape and size. And thus the shape, number and scale of every element of an actual product are not limited as shown in the drawings and can be varied according to actual requirement.

Figure 2:
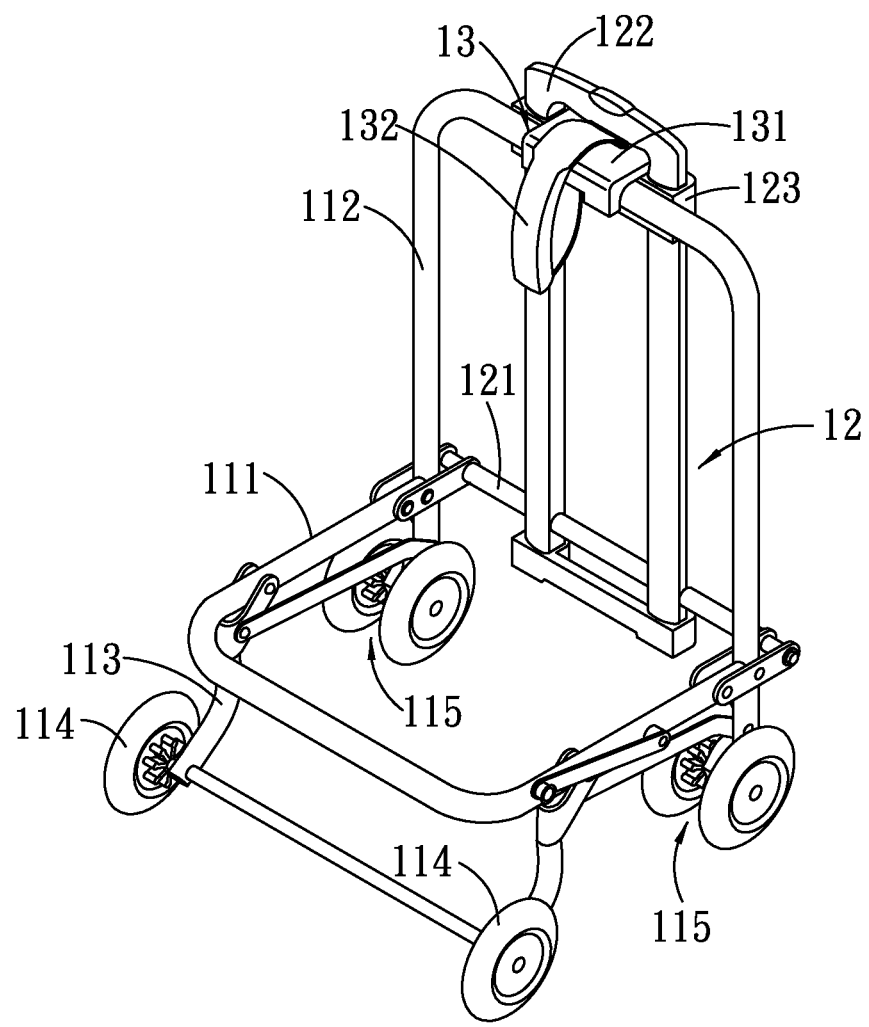
FIG. 2 is a perspective view of a level pulling type pet carrying cart according to a preferred embodiment of the present invention.
Figure 3:
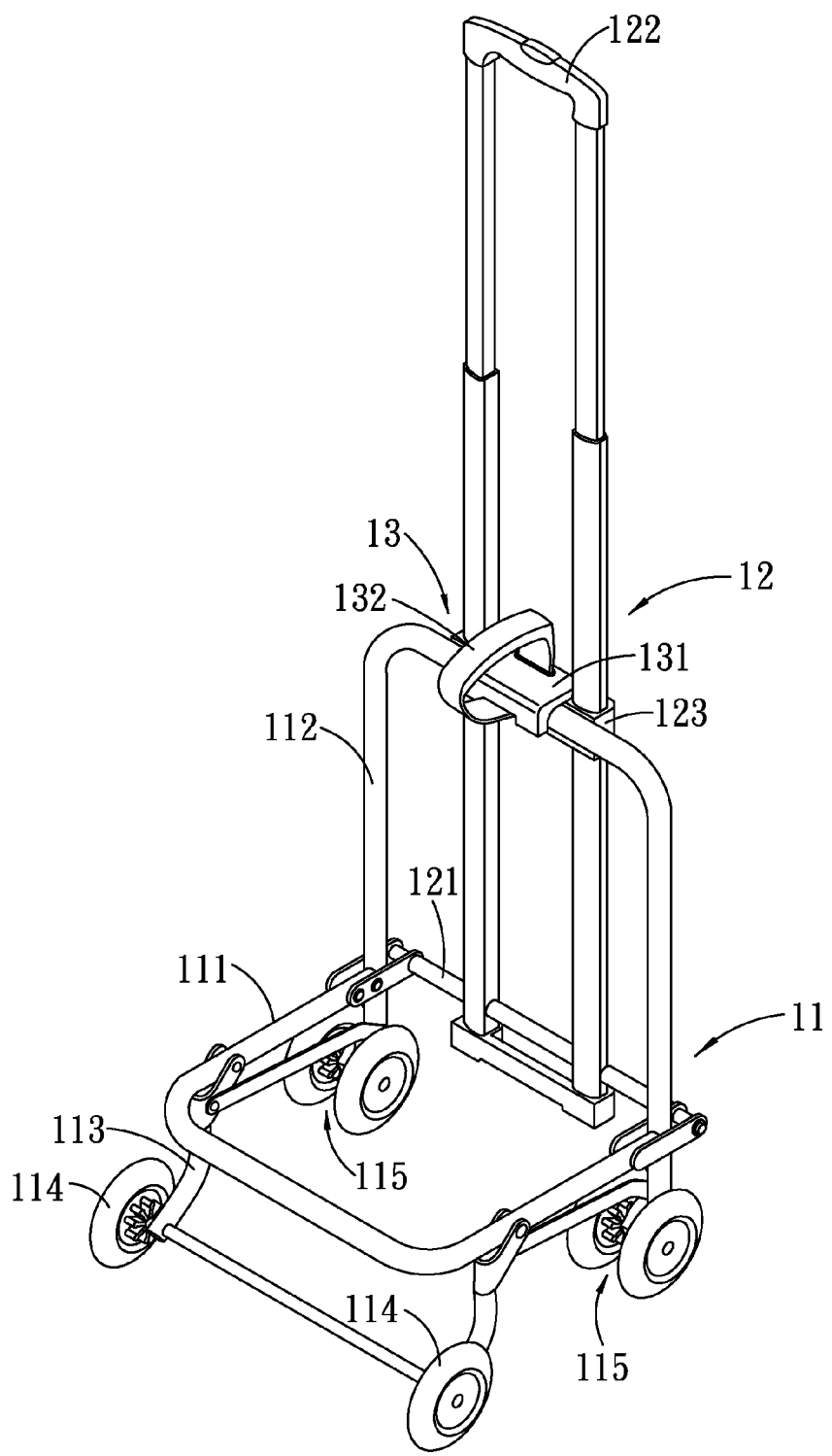
FIG. 3 is another perspective view of the level pulling type pet carrying cart according to the above preferred embodiment of the present invention.

Referring to FIG. 2 to FIG. 3 of the drawings, a level pulling type pet carrying cart according to a preferred embodiment of the present invention is illustrated. FIG. 2 and FIG. 3 are perspective views of the pet carrying cart 1, wherein the pet carrying cart 1 comprises a main body 11, a rotatable pushing arrangement 12, and a retaining assembly 13.

The main body 11 comprises a base frame 111 and a side frame 112. The side frame 112 is positioned at a rear side of the base frame 111. Two foldable bending rods 113 are extended from a front side of the base frame 112 at a left side and a right side below the base frame 111 respectively, wherein each of the foldable bending rods 113 is provided with a first wheel 114 at an outer side thereof. Two second wheel sets 115 are extended from a left side and a right side below the side frame 112 respectively. Each of the first wheels 114 can rotate in a forward direction. The second wheel set 115 comprises two second wheels and is capable of rotating for 360°. In addition, a foldable connecting panel is provided between the base frame 111 and the side frame 112 at each side thereof in such a manner that the base frame 111 is capable of being overlappedly aligned with the side frame 112.

The rotatable pushing arrangement 12 comprises a connecting arm 121 and a telescoping pushing arm 122, wherein the connecting arm 121 is provided at the rear side of the base frame 111 and also at the rear side of the side frame 112. The telescoping pushing arm 122 is pivotally connected to a substantially center of the connecting arm 121, wherein the telescoping pushing arm 122 is capable of stretching and retracting as well as rotating with respect to the connecting arm 121 in such a manner that the telescoping pushing arm 122 leans on the side frame 112 and is capable of rotating in a direction away from the side frame 112. A positioning ring 123 is provided at a center of the telescoping pushing arm 112 in such a manner that the positioning ring 123 is wound around an outer circumference of the telescoping pushing arm 112.

The retaining assembly 13 comprises a retaining base 131 and a connecting band 132, wherein the retaining base 131 is provided at a center of the telescoping pushing arm 122 and is capable of moving upwardly or downwardly. The connecting band 132 comprises a first end connected to a top surface of the retaining base 131 to pull the retaining base 131 to move upwardly and a second end connected to a center on top of the side frame 112.

Figure 4:
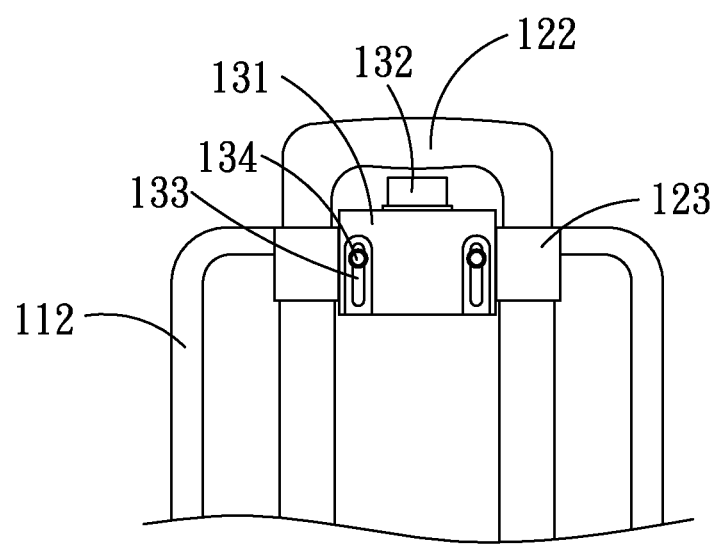
FIG. 4 is a rear view of a portion the level pulling type pet carrying cart according to the above preferred embodiment of the present invention.

Referring to FIG. 4 of the drawing, a rear view of a portion of the pet carrying cart is illustrated. The retaining base 131 has two sliding slots 133 at a rear side thereof, wherein the retaining base 131 further comprises two locking members 134 slidably provided in the two sliding slots respectively, so that the retaining base 131 is retained at the positioning ring 123 in such a manner that the retaining base 131 is capable of sliding upwardly or downwardly with respect to the positioning ring 123.

According to this preferred embodiment, the base frame 111 is a U-shape frame with an opening at a rear side thereof. The side frame 112 is another U-shape frame with another opening at a bottom side thereof. It is worth mentioning that the structure of the base frame 111 and the side frame 112 are not limited to the U-shape frame structure as described above and can be embodied into any equivalent frames.

Figure 5:
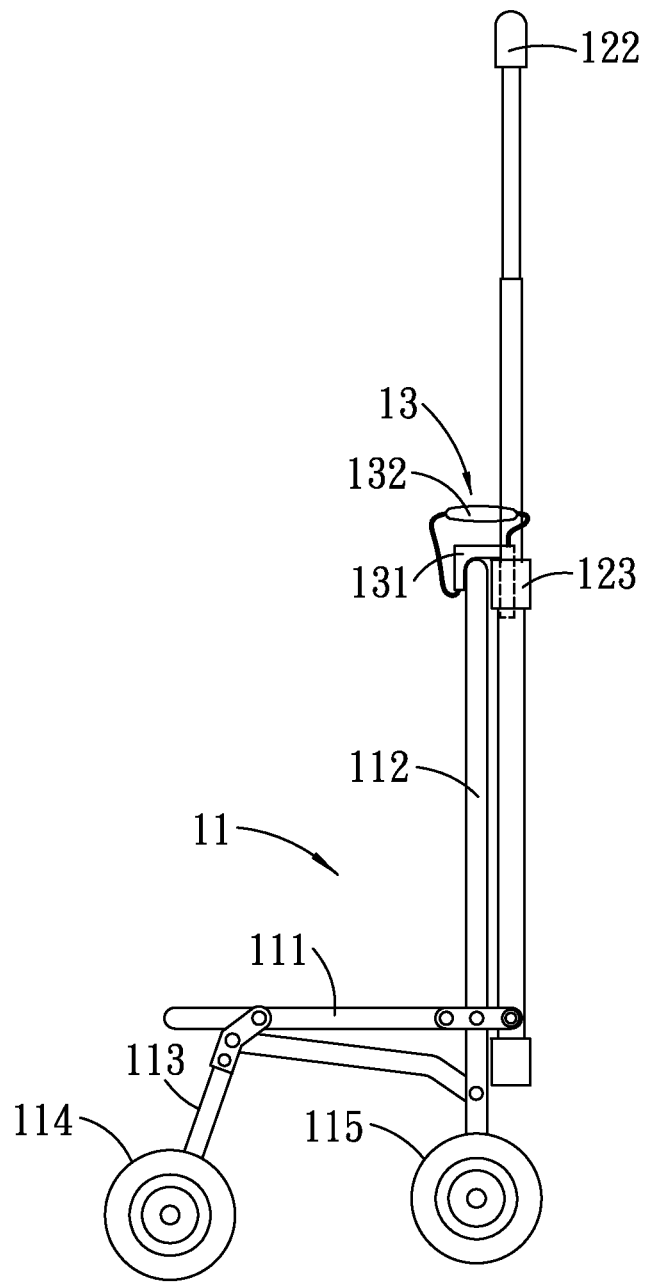
FIG. 5 is a sectional view of the level pulling type pet carrying cart according to the above preferred embodiment of the present invention.
Figure 6:
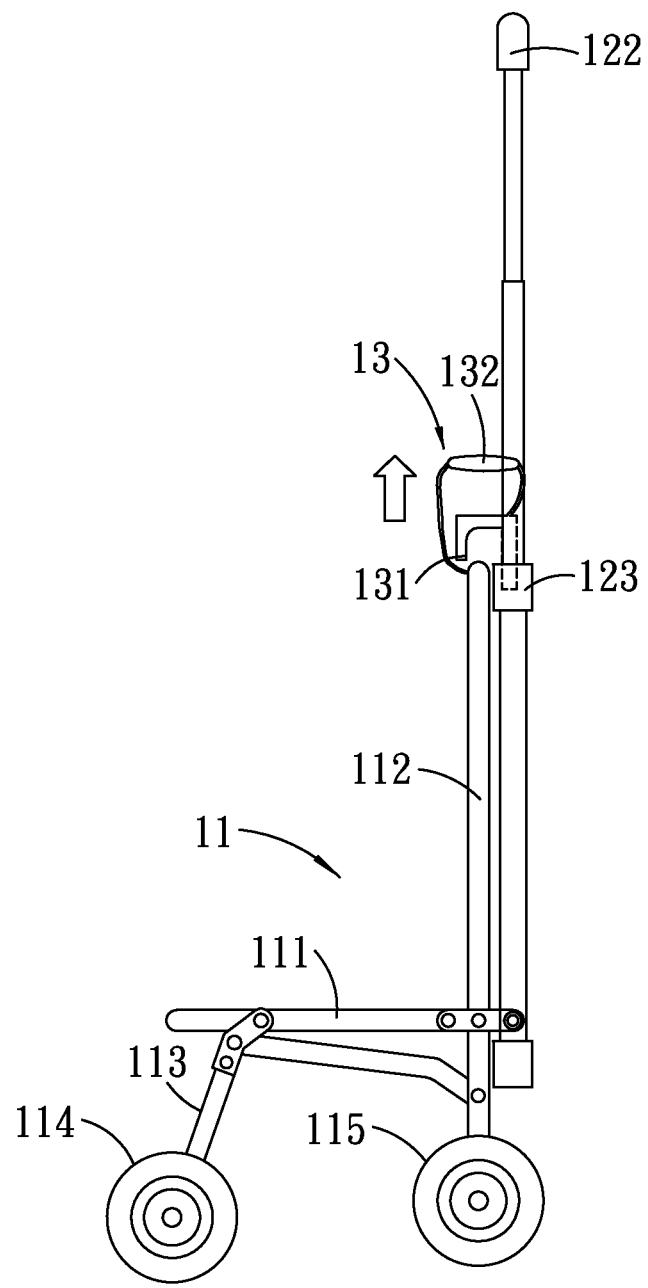
FIG. 6 is a sectional view illustrating a connecting band of the level pulling type pet carrying cart being pulled upwardly according to the above preferred embodiment of the present invention.
Figure 7:
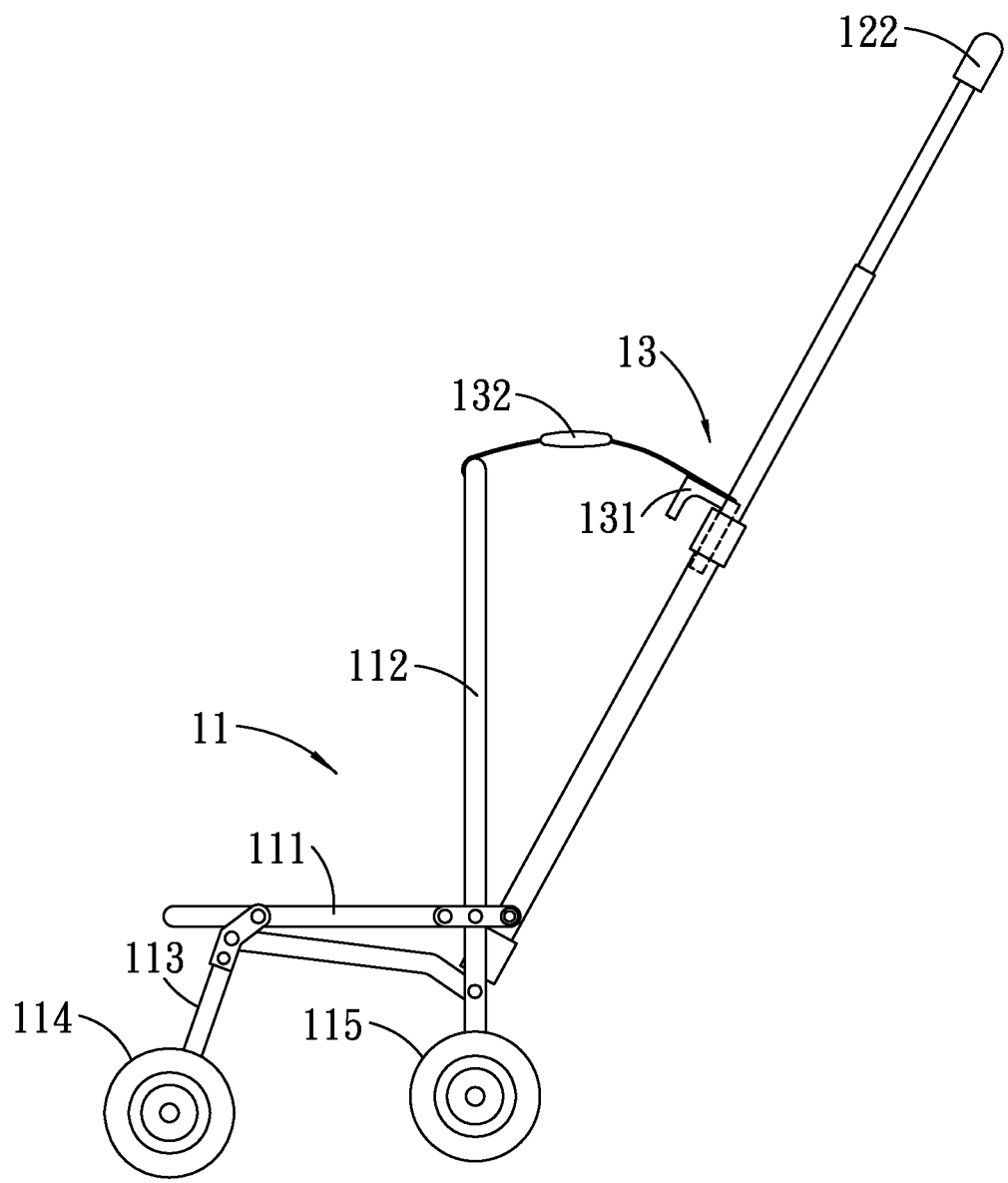
FIG. 7 is a sectional view illustrating a telescoping pushing arm of the level pulling type pet carrying cart being rotated backwardly according to the above preferred embodiment of the present invention.
Figure 8:
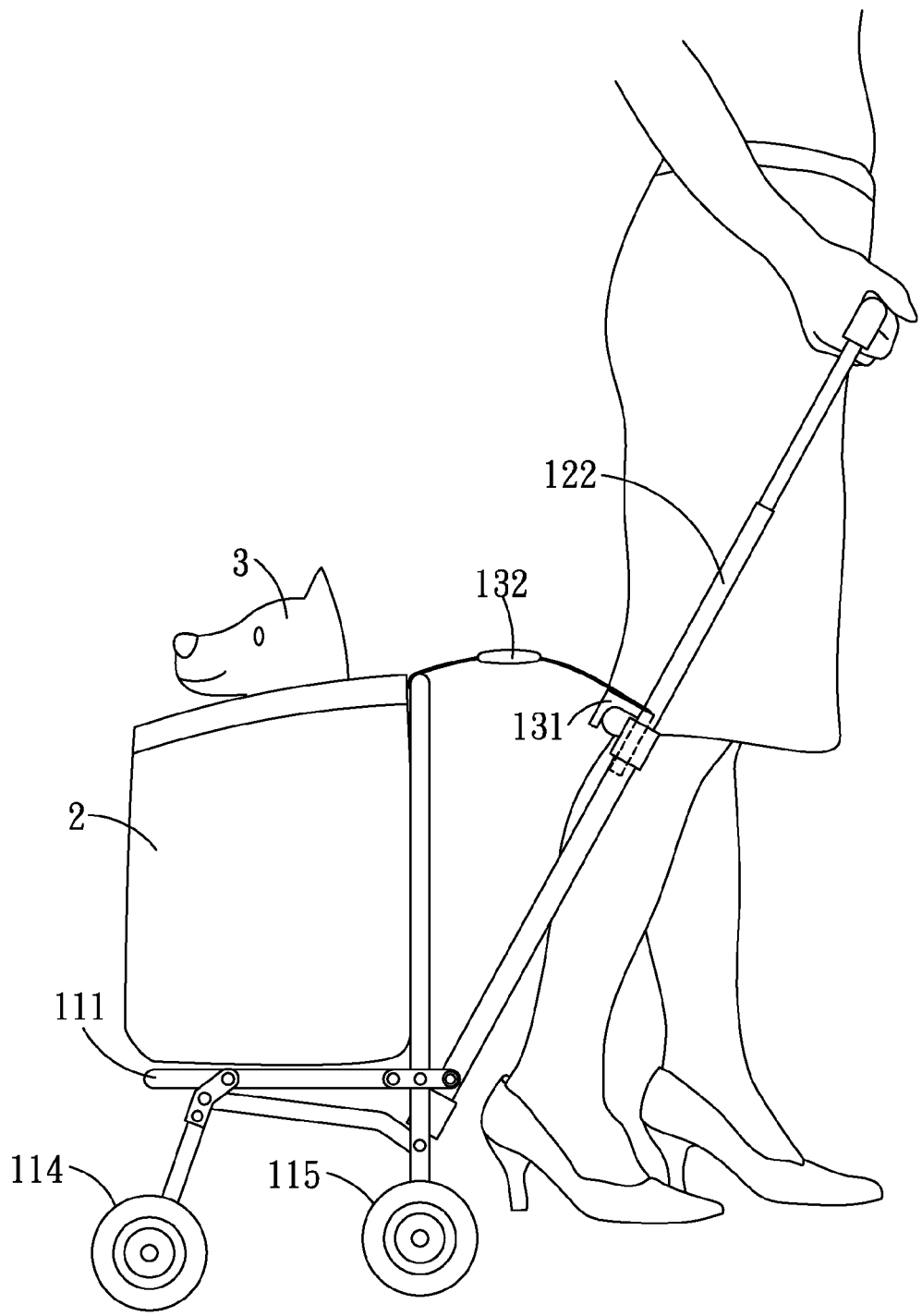
FIG. 8 is a schematic view illustrating the level pulling type pet carrying cart being in use according to a preferred embodiment of the present invention.

FIG. 5 is a sectional view of the level pulling type pet carrying cart. FIG. 6 is a sectional view illustrating a connecting band of the level pulling type pet carrying cart being pulled upwardly. FIG. 7 is a sectional view illustrating a telescoping pushing arm of the level pulling type pet carrying cart being rotated backwardly. FIG. 8 is a schematic view illustrating the level pulling type pet carrying cart being in use. Accordingly, the connecting band 132 rides up to form a ring-shape handle. When in use, the connecting band 132 is pulled up to drive the retaining base to move upwardly, so that the retaining base 131 is detached from the side frame 112 and the telescoping pushing arm 122 can rotate backwardly. Accordingly, the rotation angle of the telescoping pushing arm 122 is controlled by the connecting band 132, so that the telescoping pushing arm 122 rotates with a suitable angle and is prevented from over rotating and reaching the ground. Referring to FIG. 8 of the drawing, when in use, a pet bag 2 is provided on the base frame 111. By pushing the level pulling type pet carrying cart 1 along a horizontal level, the pet carrying cart can move smoothly in balance, and the pet 3 can be carried therein comfortably and securely.

In addition, under different conditions, for example, when going across a road, if a user wants to move quickly, he or she can simply remove the retaining base 131 to be positioned on top of the side frame 112 and be in a state as shown in FIG. 5 of the drawing, so that the pet carrying cart 1 can move in an inclined state as a pet carrying cart with a conventional structure.

It is worth mentioning that the size of the pet carrying cart 1 can be varied, so that any small, middle, or big size dogs can be fittingly carried with the pet carrying cart 1. The structure is simple and also very convenient to use. When it is not in use, the base frame 111 can be folded to overlap with the side frame 112, so that it does not occupy storage space and is convenient for carrying outdoor.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A level pulling type pet carrying cart, comprising:
a main body comprising a base frame, a side frame, and a plurality of wheels provided below said base frame, wherein said side frame is positioned at a rear side of said base frame;
a rotatable pushing arrangement comprising a connecting arm and a telescoping pushing arm, wherein said connecting arm is provided at said rear side of said base frame and also at a rear side of said side frame, wherein said telescoping pushing arm is pivotally connected to a center of said connecting arm, wherein said telescoping pushing arm is pivotally moved with respect to said connecting arm in such a manner that said telescoping pushing arm is adapted to be pivotally moved toward said side frame and adapted to be pivotally move in a direction away from said side frame; and
a retaining assembly comprising a retaining base and a connecting band, wherein said retaining base is provided at a center of said telescoping pushing arm and is capable of moving upwardly or downwardly, wherein said connecting band comprises a first end connected to a top surface of said retaining base and a second end connected to a center on top of said side frame so as to pull said retaining base to move upwardly and also controlling a rotation angle of said telescoping pushing arm.

2. The level pulling type pet carrying cart, as recited in claim 1, further comprising two foldable bending rods extended from a front side of said base frame at two sides below said base frame respectively, wherein each of said foldable bending rods is provided with a first wheel at an outer side thereof, wherein two second wheel sets are extended from two sides below said side frame respectively.

3. The level pulling type pet carrying cart, as recited in claim 2, wherein said foldable bending rods are extended from said front side of said base frame at a left side and a right side below said base frame respectively and is capable of rotating in a forward or backward direction.

4. The level pulling type pet carrying cart, as recited in claim 2, wherein said two second wheel sets, each comprising two second wheels, are extended from a front side and a right side below said side frame respectively and is capable of rotating for 360 degrees.

5. The level pulling type pet carrying cart, as recited in claim 1, further comprising a positioning ring provided at a center of said telescoping pushing arm, wherein said positioning ring is wound around an outer circumference of said telescoping pushing arm.

6. The level pulling type pet carrying cart, as recited in claim 5, wherein said retaining base has two sliding slots at one side thereof, wherein said retaining base further comprises two locking members slidably provided in said two sliding slots respectively, so that said retaining base is retained at said positioning ring in such a manner that said retaining base is capable of sliding upwardly or downwardly with respect to said positioning ring.

7. The level pulling type pet carrying cart, as recited in claim 1, wherein when said telescoping pushing arm is moved toward said side frame, said retaining base moves downwardly to be hooked on a top side of said side frame, so as to enable said telescoping pushing arm to be retained on said side frame in position.

8. The level pulling type pet carrying cart, as recited in claim 1, wherein when said telescoping pushing arm is moved toward said side frame, said connecting band rides up to form a ring-shape handle.

9. The level pulling type pet carrying cart, as recited in claim 1, wherein said base frame is a U-shape frame with an opening at a rear side thereof, wherein said side frame is another U-shape frame with another opening at a bottom side thereof.

10. The level pulling type pet carrying cart, as recited in claim 1, further comprising a foldable connecting panel provided between said base frame and said side frame at each side thereof in such a manner that said base frame is capable of being overlappedly aligned with said side frame.

* * * * *